March 22, 1960  E. A. HUND ET AL  2,929,653
LIFTING CUP FOR ARTICLE TRANSFERRING APPARATUS
Filed June 28, 1954  3 Sheets-Sheet 1
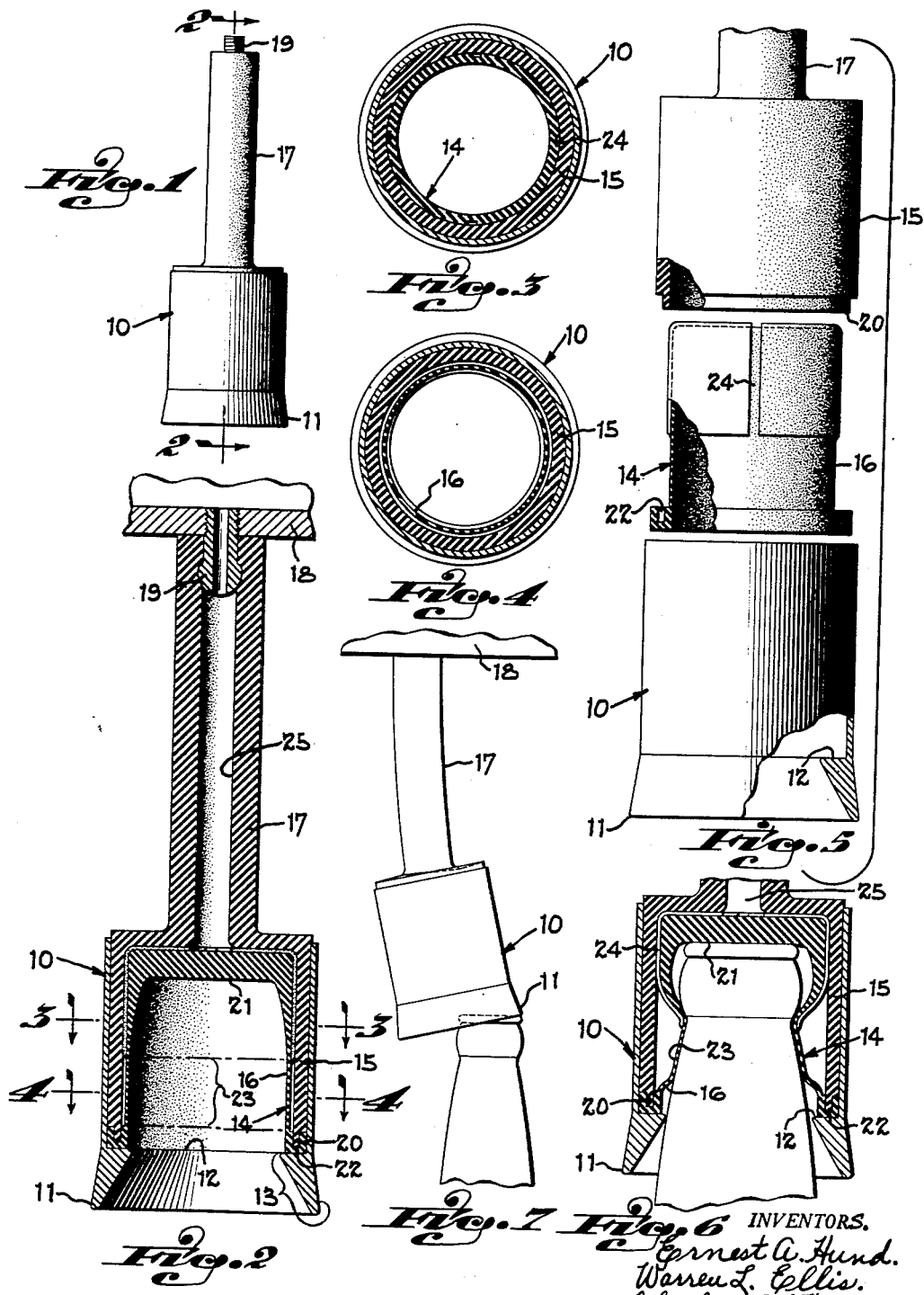
INVENTORS.
Ernest A. Hund.
Warren L. Ellis.
BY Charles J. McHugh, Jr
Wood, Herron & Evans.
ATTORNEYS.

March 22, 1960 E. A. HUND ET AL 2,929,653
LIFTING CUP FOR ARTICLE TRANSFERRING APPARATUS
Filed June 28, 1954 3 Sheets-Sheet 2
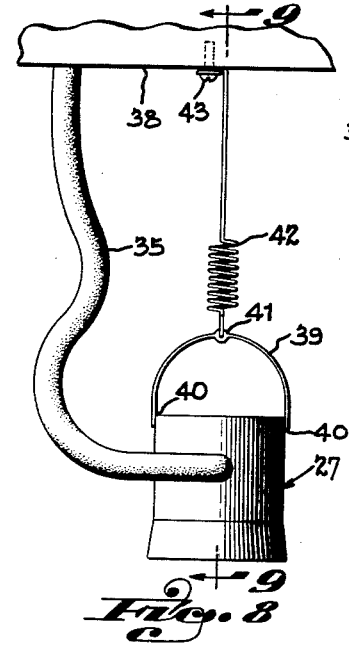
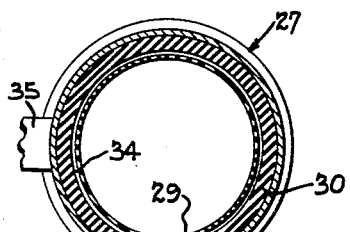
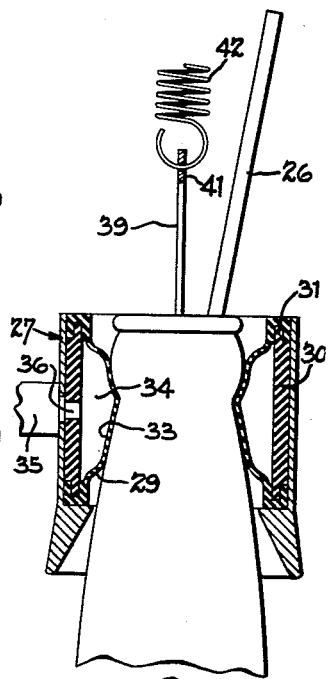
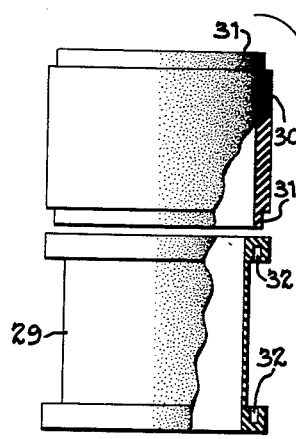
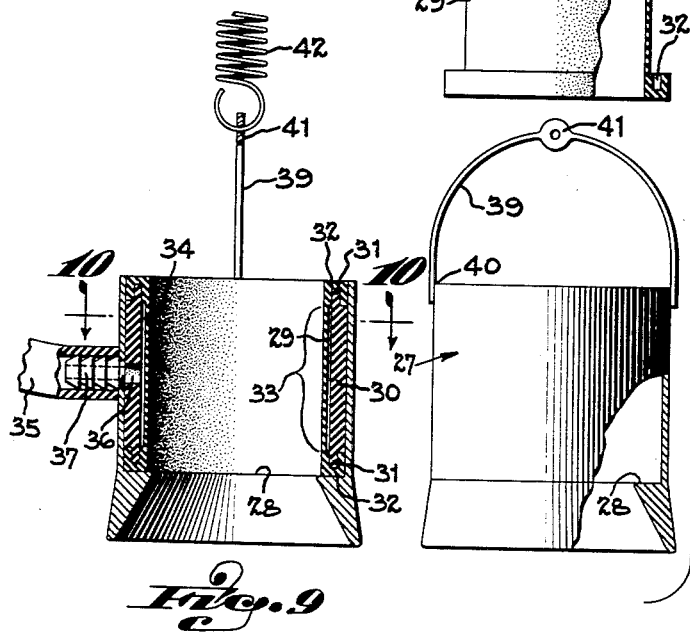
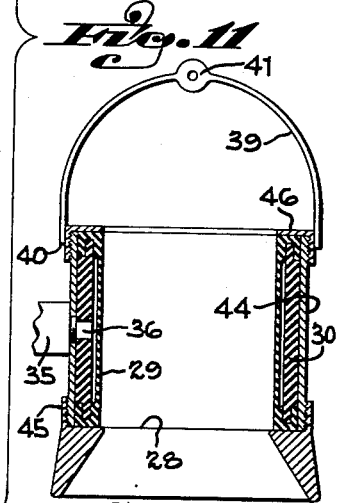
INVENTORS.
Ernest A. Hund.
Warren L. Ellis,
Charles J. McHugh, Jr.
BY Wood, Herron & Evans.
ATTORNEYS.

INVENTORS.
Ernest A. Hund.
Warren L. Ellis.
Charles J. McHugh, Jr.
BY Wood, Herron & Evans
ATTORNEYS.

United States Patent Office 2,929,653
Patented Mar. 22, 1960

2,929,653
LIFTING CUP FOR ARTICLE TRANSFERRING APPARATUS

Ernest A. Hund, Fort Thomas, Ky., and Warren L. Ellis and Charles J. McHugh, Jr., Cincinnati, Ohio, assignors, by mesne assignments, to The Lodge & Shipley Company, a corporation of Ohio Application June 28, 1954, Serial No. 439,644

2 Claims. (Cl. 294—64)

This invention relates to article transferring apparatus of the general type disclosed in the patent to Schmutzer et al., No. 2,308,209, issued January 12, 1943; and the application of Ernest Meierjohan, Serial No. 285,237, filed April 30, 1952, which has now issued as Patent No. 2,695,190. Machines of this general type are used for transferring articles from one location to another, for instance, for unloading cases of beer bottles or soft drink bottles from wooden or cardboard containers and placing them on endless belts leading to bottle washing machinery or for removing bottles or the like from endless belts and placing them in cases. The device of this invention will be explained in relation to a machine for unloading cases of bottles, although it may be used for a variety of analogous purposes.

A case unloading machine may have four lifting heads and thus be able to unload four cases of twenty-four bottles each per cycle of operation. It is therefore very important that each individual device which engages a bottle to lift it and transfer it operates with complete accuracy and reliability, otherwise the machine attendant may find it impossible to transfer enough bottles by hand to keep up with the pace of the line of automatic machinery in which the case unloader is included.

The present invention relates to the construction of the lifting cups or article-engaging members which are used on machines of the type indicated and is specifically illustrated by a lifting cup which is sized and proportioned for the handling of standard export beer bottles. The same member may also handle other types of beer bottles and many soft drink bottles, but it is to be understood that articles having individual or peculiar neck configurations may require specially proportioned lifting cups to handle them. The lifting cup of the present invention is adapted automatically to engage itself with the neck of a bottle and to lift the bottle with it when the cup itself is lifted. The lifting cup of this invention comprises an outer shell which houses an inner bladder, a flexible connection between the cup and the lifting head, and a centering lower rim for engaging the cup with the bottle. After the cup is engaged over the neck of the bottle the bladder is inflated, which grips the neck of the bottle so that the bottle moves with the cup when the latter is elevated by the lifting head.

As a practical matter, the big problem in constructing a machine of the type in question is not merely the mechanical gripping of the bottle by a cup or other means; rather, the problem arises from the circumstance that the bottles, when presented to the machine, are not arranged in any reliably accurate geometric pattern. In general, bottles are return to breweries and soft drink bottling establishments in cardboard cases which are often quite a bit the worse for wear. In some cases these cardboard cases are internally compartmentized and in other cases they are not, but in any event the compartments do not center bottles accurately and the entire package is inevitably warped or distorted, at least to some degree as a result of routine handling.

If the lifting cups of a case unloading machine are mounted upon a lifting head in fixed positions, the cups are bound to miss a certain number of bottles which are misaligned. This is very undesirable. For instance, even if a four-head carton-unloading machine is 90% efficient, the machine will miss about nineteen bottles per cycle, which makes it impossible for a single machine attendant to keep up with the production line. On the other hand, if the machine is 99% efficient, the attendant does not have to handle enough bottles per cycle to interfere with his other operating duties. The problem, therefore, is to provide lifting cups adapted to pick up the highest possible percentage of bottles. The lifting cups of the present invention solve the problem and impart high efficiency to a case unloading machine. This desired result is accomplished by the combination of a bladder housed in a shell which has a flared cup-centering mouth in the lower rim portion thereof and flexible means connecting the shell to the lifting head, whereby the bottle and lower rim portion interengage to substantially center the cup and bottle with substantial dependability, and almost instantaneously. The lower rim portion protects the bladder from striking engagement with the tops of the bottles.

A second feature of the lifting cup of the invention is that the lifting cup is adapted to release the bottle on a continuously moving belt without the lifting head itself moving with the belt. This too is accomplished by virtue of the combination of the flexible mounting by which the cup is suspended and the flared mouth in the lower rim portion of the shell. Obviously, if bottles are being transferred over a continuously moving conveyor or belt by means of a lifting head which does not move with the conveyor or belt, the bottles must be dropped a short distance onto the conveyor so that their tops clear the lifting cups, or special means must be provided to keep the stationary cups from upsetting the traveling bottles if the bottles engage the continuously moving belt before being released. A few upset bottles cause a very substantial amount of disturbance of the production line. The lifting cups of the present invention not only release the bottles very quickly after their bottoms are in engagement with the endless belt but permit clearance of bottle and cup in a manner which does not upset the bottle. The lifting cups of the present invention are more specifically disclosed in the accompanying drawing in which:

Figure 1 is a side elevation of the lifting cup.
Figure 2 is a sectional view on line 2—2 of Figure 1.
Figure 3 is a sectional view on line 3—3 of Figure 2.
Figure 4 is a sectional view on line 4—4 of Figure 2.
Figure 5 is an exploded view of the component parts of the lifting cup, partly in section.
Figure 6 is a vertical sectional view of the lifting cup when inflated to engage the neck of a bottle.
Figure 7 is a diagrammatic view which illustrates the action of the cup in centering itself over a bottle.
Figure 8 is a vertical elevation of a modified form of lifting cup.
Figure 9 is a sectional view taken on line 9—9 of Figure 8.
Figure 10 is a sectional view taken on line 10—10 of Figure 9.
Figure 11 is an exploded view of the component parts of the lifting cup disclosed in Figure 8.
Figure 12 is a vertical sectional view of the lifting cup disclosed in Figure 8 when inflated to engage the neck of a bottle.
Figure 13 is a vertical sectional view of a modification of the type of lifting cup disclosed in Figure 8.
Figure 14 is a vertical sectional view of a modification of the type lifting cup disclosed in Figure 13.

Figure 14:
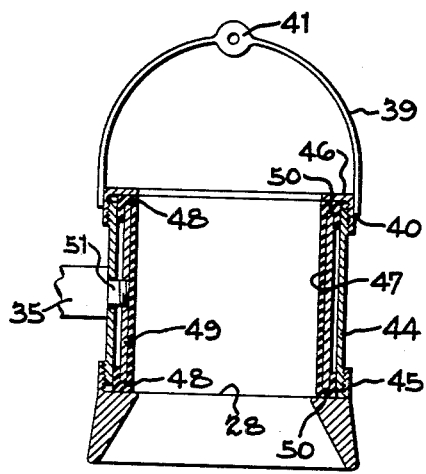

The lifting cup device illustrated in Figures 1-6 of the drawings comprises a cylindrical metallic outer shell 10 which is provided with an outwardly flared mouth in the lower rim portion designated 11. The throat or opening into the lower end of the outer shell is provided with an internal, right angular offset or shoulder 12. The lower edge and inside of the flared rim preferably are provided with a dense chromium plating in the area designated 13 in Figure 2, which plating may be highly polished. The dense and highly polished plating in the mouth and throat areas of the lower portion of the shell protects the rim from abrasion and provides a hard, slippery surface which slides easily over the upper rims of bottles. The entire shell may be chromium plated, and preferably is, to avoid corrosion and to provide maximum appearance of polish and cleanliness.

A bladder which is indicated generally by the numeral 14 resides within shell 10, being disposed in the upper cylindrical portion of the shell between offset 12 and the top of the shell. As disclosed, the offset projects inwardly to form an annulus which has a diameter less than that of the bladder when the bladder is uninflated whereby the bladder is protected from the wear and abrasion which would otherwise occur incident to the engagement of a succession of bottles.

The bladder is constituted by two pieces of individually molded gum rubber or other suitable plastic including an outer member 15 and an inner member 16. The bladder member 15 is molded as an integral part of a flexible stem 17 by means of which the cup assembly may be suspended from a manifold frame such as the one shown fragmentarily at 18. A metal nipple 19 which may be molded into the upper end of stem 17 has external threads thereon which are adapted to thread into an appropriate opening in the frame. The shoulder provided by the flat upper end of the stem, when engaged with the underside of the frame, is found to effectively seal the connection between the frame and nipple so that auxiliary sealing means are not required.

The outer member 15 is cylindrical and adapted to fit snugly within the upper cylindrical portion of shell 10 above the shoulder 12. This cylindrical part of the outer member terminates at its lower end in an offset inner lip 20. The inner bladder member 16, which also is molded in one piece, includes the inner wall which is adapted to engage the neck of a bottle. The inner member 16 is cup-shaped, being substantially cylindrical and closed at the top by a wall 21. The side wall of the inner bladder member is thicker in the upper portions and it terminates in a lower edge which is substantially channel-shaped in cross section to provide a groove 22 which extends around the outside of the member, opening upwardly and configurated to receive lip 20 so as to embrace it. In assembling the bladder, the inner member 16 is inserted into the outer member 15 with the lip 20 seated in groove 22. The two parts then may be vulcanized or cemented together if desired. The assembled bladder then may be inserted into shell 10 as shown in Figure 2 with the lower rim of the assembled bladder resting snugly against the right angular offset 12. The bladder assembly may be permanently affixed to the shell by vulcanizing or cement. Situated in this way the two-piece bladder is unlikely to leak air inasmuch as internal pressure between the two bladder portions tends to seal the joint between lip 20 and groove 22.

As has been indicated above, the inner bladder member is of varying thickness. The lower portion thereof is substantially thinner than the rest of the side wall in the area designated 23 wherein the outside of the wall has a substantially broad but shallow groove formed therein circumferentially. It is this thinner portion of the bladder which is adapted to expand when air is introduced to grip the neck of the bottle to be lifted. Air enters this portion of the bladder through grooves 24 which are formed into the outside of the wall of inner bladder member 16. These grooves extend upwardly through the thicker portion of the wall and across the top. In the illustrative embodiment, two open grooves are shown, each groove extending up one side, across the top and down the opposite side, the two grooves being offset 90° with respect to one another. With the inner bladder member socketed within the outer bladder member, the grooves constitute passageways or ducts which open into the internal passageway 25 through stem 17. Thus, application of air pressure within the manifold 18 causes the bladder to expand inwardly, but only in the annular area designated 23, inasmuch as the upper part of the inner member is substantially thicker in cross section.

The construction shown has the advantage that when the bladder is not under pressure, very little air is enclosed, so that a relatively small volume of air is all that is necessary to produce the bladder expansion action necessary to grip the neck of a bottle. Similarly, when a bottle is to be released, only a relatively small amount of air need be sucked out in order to accomplish the required retraction of the bladder. This feature is valuable from the point of view of releasing bottles onto a moving belt without having at least some of the bottles upset.

In a typical case unloading machine which is designed to unload simultaneously four cases of twenty-four bottles each, the lifting cups are suspended from a manifold frame on centers which correspond to the designated centers of the bottle compartments in the four cases, the cases being arranged end to end in closely spaced relationship. Of course, after the cases have been used, and even as a result of routine handling, the bottles in the cases to be unloaded are not precisely aligned and, in fact, they may be very badly out of line. The flexible nature of the hoses or tubes which suspend the cups, in conjunction with the outwardly flared mouths of the cups compensate for such misalignment so that when the manifold frame is lowered, the cups automatically seek the necks of the bottles. It is found that a cup can successfully engage over the top of a bottle which is as much as one inch off center with respect to the central axis of a freely hanging cup.

By way of illustration only, the inside diameter of the throat at shoulder 12 may be approximately 15/16 inches. This diameter is found to accommodate the majority of export beer bottles currently in use. The inside diameter of the entrance to the mouth at the lower end thereof may be 1¾ inches, which, with the rounded lower edge at each side, makes the outside diameter of the rim approximately 1⅞ inches. The flare to the outer wall in the lower rim area may be approximately 10°. The flare at the inside of the mouth may be approximately 30°, making the slant height of the mouth at the inside of the lower portion of the cup approximately 9/16 inch. These dimensions are given by way of example only and refer to a lifting cup designed for beer bottles, it being understood that they may be changed to accommodate the necks of different types of bottles, for example milk bottles.

In a typical installation, the cases of bottles may move along a conveyor to an unloading position in which four cases are disposed end for end and parallel with the manifold head which supports the lifting cups. The manifold head may be arranged to swing over to a position directly above the cases and then move vertically downwardly to engage the cups over the necks of the bottles in the cases. At this time air pressure may be applied to the manifold to inflate all of the bladders in all of the cups simultaneously. It is found that the air pressure does not have to be appreciably greater than six pounds per square inch in order to grasp the bottles securely. Upon inflation of the bladders in the cups, the head may be moved vertically upwardly to withdraw the bottles from the cases. From this point, the head may be translated sideways from the line of cases to a place above a moving conveyor belt, such as the one used on an "unscrambler table" of a bottle washing machine. The bottles may be lowered onto the moving conveyor, the pressure in the bladders released, and the manifold frame then raised. Surprisingly enough, this may be done without causing the bottles to topple and fall. This is the result of the use of the flexible connection between frame and cups and the use of cups having flared mouths of the type disclosed. To insure positive, speedy release of the bottles it is recommended that the air be withdrawn from the manifold by positive mechanical means designed to pull the air out instantaneously. If this is done, it is found that the bladders do not adhere to bottles which have sticky substances on them. The recessed relationship of the bladders in each cup with respect to shoulder 12 insures a clean break, particularly in an operation where a slight vacuum is pulled in the exhaust portion of the air pressure cycle.

The modification of the invention which is disclosed in Figures 8-12 inclusive is particularly adapted for use in handling soft drink bottles. Bottles of this type present a special problem because they are more often than not returned to the bottling establishment with straws, such as those indicated at 26, protruding from their tops. While the lifting cup construction disclosed in Figures 1-6 inclusive may handle bottles from which straws protrude, the action is not completely dependable because the straws are apt to foul the cups when they are lowered to engage the bottles. The modified form of cup comprises a cylindrical metallic outer shell 27 which may be substantially identical to the one previously described. In this instance, the outwardly flaring mouth of the shell terminates at its upper end in a shoulder which is designated 28. The bladder element utilized comprises a pair of inner and outer substantially cylindrical members designated respectively 29 and 30, which may be molded from rubber or other resilient material. The outer member of the two has a pair of inwardly offset lips 31—31 at the respective opposite ends thereof which are adapted to be recessed in a pair of channel-shaped seats 32—32 provided at the opposite ends of the inner bladder member 29. The respective lips 31—31 seat in the same way that the lip 20 seats in groove 22 of the form of the invention shown in Figure 2. The two parts of the bladder may be vulcanized or cemented together and to the shell with the lower edge of the baffle seated upon shoulder 28.

It will be noted that the upper end of the flaring mouth of this modification also terminates in a throat which is smaller in diameter than the bladder in order to protect it from wear, cuts and abrasions incident to engaging bottles. The inner bladder member has a thinner portion defined by a broad, shallow channel which extends around it circumferentially in the area thereof designated 33. The channel, formed in the outer wall portion of the inner bladder member, defines with the outer bladder member an annular air passageway 34. This passageway is in communication with the interior of a flexible rubber hose 35 through an opening 36 in the wall of the outer bladder member and through a hollow connector 37 which is threaded into the shell and which is engaged within hose 35. The upper end of hose 35 may have a nipple (not shown) which is similar to nipple 19 and which is threaded into the manifold frame indicated at 38 in this instance. The hose 35 should be sufficiently flexible so as to not interfere with movement of the cup since the hose serves only as a means to convey air under pressure from the manifold to passageway 34.

The upper end of the cup in the modification illustrated in Figures 8-12 is completely open with the exception of a yoke 39 which yoke may be formed of stiff wire bent in the shape of a U and having its two ends affixed as at 40 by welding or other known means to the outer shell adjacent to the upper end thereof at diametrically opposite points. In the instance shown, the top center of the yoke is flattened and pierced as at 41 to provide means for rigidly attaching the lower, hook end of a spring 42. The upper end of the spring also is bent in the form of a hook which is turned over at right angles and secured by a bolt 43 to the underside of manifold frame 38. The spring shown has only a short section thereof which is coiled, the major portion being a simple straight wire. The purpose of this spring is to suspend the cup from tilting or swinging movement so that the cup can accommodate itself to misaligned bottles just as in the form of the invention disclosed in Figures 1-7. If desired, the attachment at 40—40 for the extending ends of the U-shaped yoke may be on pivot pins (not shown) so that the combination of such an attachment and a freely swinging hook attachment for the spring 42 to the yoke will result in a gimbal ring effect insofar as the swinging movement of the cup relative to its attachment is concerned.

The modification shown in Figure 13 is very similar to the one of Figures 8-12, the only difference being the provision of a three-part outer shell instead of one made as an integral unit. The outer shell comprises a cylinder 44 which is threaded externally at its opposite ends. The lower rim portion which is a separate part has an upstanding annular flange 45 thereon which is threaded internally to engage the threads at the lower end of cylinder 44. A flanged cap 46, which is open to accommodate straws, threads onto the upper end of cylinder 44. The bladder element utilized is the same one shown in Figure 9, however, the cap 46 serves to hold it in place against the shoulder 28 so that it is not necessary to either vulcanize or cement it into place.

Figure 14 shows another modification, which is very similar to the one shown in Figure 13, however, in this case a one-piece bladder 47 is employed. The outer shell is made in three pieces including the cylinder 44, an upper cap 46, and a lower rim portion which includes an internally threaded, upstanding flange 45. The cap and flange engage threads in the respective opposite ends of cylinder 44. The bladder utilized has upper and lower edge portions which turn outwardly and downwardly to provide two annular grooves 48—48 which extend around the outside of the bladder circumferentially thereof. These two grooves fit over the opposite ends of a metal cylinder 49, with the cylinder surrounding the bladder and with rounded rims 50—50 at the upper and lower ends of the cylinder 49 seated in the respective grooves 48—48. The cylinder 49, therefore, serves to both hold the bladder in place and to make it air tight; because it will be seen that upon tightening of the cap 46, the rounded rims 50—50 of the cylinder 49 will bite into and tightly seat in the respective grooves 48—48 of the bladder. A connector 51 to which hose 35 attaches in this instance, traverses an opening in the outer shell 44 and threads into the wall of the cylinder 49, so that air in the manifold is in communication with the space between the outside of the bladder and the inside of the inner wall of the cylinder 49.

Figure 15:
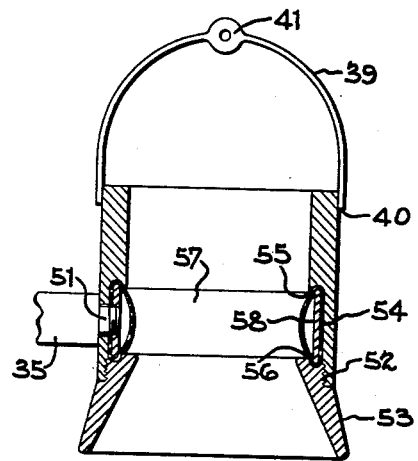
Figure 15 is a vertical sectional view of a lifting cup having a bladder construction different from those disclosed in Figures 1 through 14, inclusive.

A somewhat similar method is utilized to lock and seal in place the bladder member which is shown in Figure 15. In this instance the wall of the cup above the bladder is substantially thicker than the modification previously described. The lower end thereof is threaded internally as at 52 to receive a separate, lower rim element 53, the rim element being adapted to be engaged on threads 52. The inner wall of the cup in this modification has an annular groove 54 therein immediately above threads 52. The upper side of groove 54 has a seat 55 formed therein. A similar seat indicated at 56 is formed in the upper face of the removable rim element 53. A length of rubber tubing 57 is used to form the bladder, this tubing being split circumferentially and then engaged around a flat, metal ring 58 and the ends sealed together. The tube thus engaged on the ring is seated within groove 54 and the removable lower rim then threaded into place. This both seals and locks the bladder with its respective upper and lower edges engaged in the seats designated 55 and 56. A nipple and hose connection may be employed to conduct air pressure to the bladder, the inner end of the connection threading into and through the wall of the ring 58.

Figure 16:
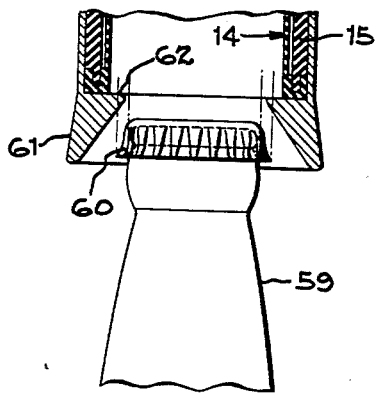
Figure 16 is a vertical sectional view of the type lifting cup disclosed in Figure 1, wherein the rim of the cup is dimensioned to reject crowned bottles.

Quite often, in the unloading of bottles, a case is found having one or more capped bottles. A capped bottle can play havoc in an automatic washing machine. It is highly desirable, therefore, to provide some means to automatically reject these bottles. In the present instance, this is accomplished by the means shown in Figure 16. In this figure, the numeral 59 designates a bottle and numeral 60 designates a cap of standard size which is on the bottle. An outwardly flared mouth for a bottle lifting cup is indicated at 61. The throat opening into the cup at the offset shoulder indicated at 62 in this figure is made of such a size that it will readily pass the necks of uncapped bottles but will not pass capped bottles. Thus, in operation when the cup is lowered onto a capped bottle, the cup stops upon engagement of the cap with the flared rim so that the flexible connection for the cup to the manifold frame simply bends. After the manifold frame is raised to lift all of the uncapped bottles from the carton, the capped bottle may be removed manually by the attendant of the machine.

Figure 17:
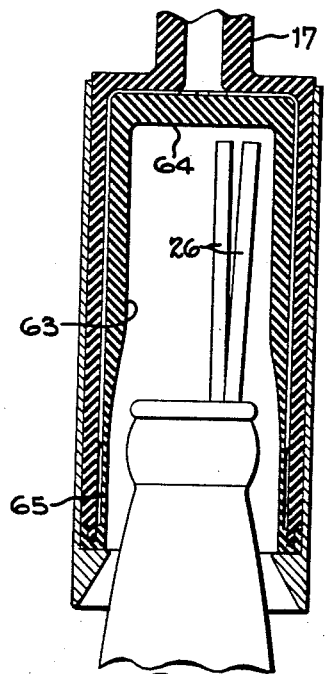
Figure 17 is a vertical sectional view of the type lifting cup disclosed in Figures 1 through 7, inclusive, wherein the cup is proportioned to lift the bottle even if straws are left in the bottles.

Figure 17 of the drawings discloses another way of accommodating bottles which are returned with straws in them. In this modification of the invention, the bladder assembly and shell are designated generally by the numeral 63, and in this case are elongated so that the top 64 at the inside of the bladder is spaced sufficiently far above the expandable portion, indicated at 65, that it does not strike straws protruding from the bottle. It will be noted also that the sides of the cylindrical shell in the lower rim portion thereof are straight. This same type of construction may be utilized in the other modifications illustrated. It has the advantage that a deeper recess may be provided at the inside of the shell for the bladder without a corresponding increase in the diameter of the lower edge of the cup.

Having described our invention, we claim.

1. A lifting cup adapted for use on article transfer apparatus, said lifting cup comprising an outer cylindrical shell, an outwardly and downwardly flaring mouth in the lower rim portion of said shell, said mouth terminating at the upper end thereof inside of the shell at an annular throat which is concentric to the longitudinal central axis of the shell and which is of a diameter substantially smaller than the internal diameter of said shell, a bladder seated within said shell above said throat, said bladder comprising an outer member and an inner member each of which is in the shape of an inverted cup, said inner member being seated within said outer member in nested relationship, the lower edgewise portion of the outer member having an annular lip depending therefrom, the lower edgewise portion of the inner member having an annular channel formed thereon which embraces said lip for sealing the space between the respective inner and outer members, a hose to direct air under pressure to the space between said inner and outer members, and the lower annular portion of the inner bladder member being substantially thinner than the other portions thereof, whereby upon application of air pressure through said hose to the space between said inner and outer members, the thinner portion is caused to expand inwardly for gripping an article over which the cup is engaged.

2. A lifting cup for use on article transferring apparatus, said lifting cup comprising an outer rigid, cylindrical shell, having an outwardly and downwardly flaring mouth at the lower rim portion thereof, an inflatable bladder seated within said shell above said throat, said bladder comprising an outer member and an inner member each of which is in the shape of an inverted cup, said inner member being seated within said outer member in nested relationship, means in the lower edgewise portions of said members for selectively sealing the space between the lower edges of said members to prevent the passage of air therebetween into the atmosphere and to permit the inner member to be removed from within the outer member for replacement of the inner member, and the lower annular portion of the inner bladder member being substantially thinner than the other portions thereof, whereby upon application of air pressure to the space between said inner and outer members, the thinner portion of the inner bladder member is caused to expand inwardly for gripping an article over which the cup is engaged.

References Cited in the file of this patent

UNITED STATES PATENTS

| 1,735,287 | Lehmann | Nov. 12, 1929 |
| 2,194,989 | Torpin | Mar. 26, 1940 |
| 2,308,209 | Schmutzer et al. | Jan. 12, 1943 |
| 2,607,621 | Pulvino | Aug. 19, 1952 |
| 2,666,562 | Birch | Jan. 19, 1954 |
| 2,695,190 | Meierjohan | Nov. 23, 1954 |

FOREIGN PATENTS

| 471,609 | Canada | Feb. 20, 1951 |
| 710,775 | Great Britain | June 10, 1954 |